US012532050B1

(12) United States Patent
Agnihotri

(10) Patent No.: US 12,532,050 B1
(45) Date of Patent: Jan. 20, 2026

(54) ATSC 3.0 PLAYBACK OF ENCRYPTED MMT MEDIA THROUGH CONSTRUCTION OF DASH FILE

(71) Applicant: Sony Group Corporation, Tokyo (JP)

(72) Inventor: Tanmay Agnihotri, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/915,979

(22) Filed: Oct. 15, 2024

(51) Int. Cl.
*H04N 21/61* (2011.01)
*H04N 21/647* (2011.01)

(52) U.S. Cl.
CPC ... *H04N 21/6175* (2013.01); *H04N 21/64792* (2013.01)

(58) Field of Classification Search
CPC ..................... H04N 21/6175; H04N 21/64792
See application file for complete search history.

(56) References Cited

U.S. PATENT DOCUMENTS

| | | | |
|---|---|---|---|
| 6,005,938 | A | 12/1999 | Banker et al. |
| 6,373,904 | B1 | 4/2002 | Sakamoto et al. |
| 6,393,562 | B1 | 5/2002 | Maillard |
| 6,584,199 | B1 | 6/2003 | Kim et al. |
| 6,920,222 | B1 | 7/2005 | Tsukahara et al. |
| 8,401,191 | B2 | 3/2013 | Chen et al. |
| 8,671,422 | B2 | 3/2014 | Foti |
| 9,002,006 | B2 | 4/2015 | Chen et al. |
| 11,044,294 | B2 | 6/2021 | Agnihotri et al. |
| 11,606,528 | B2 | 3/2023 | Agnihotri |
| 2003/0073402 | A1 | 4/2003 | Herring et al. |
| 2003/0172376 | A1 | 9/2003 | Coffin |
| 2005/0198680 | A1 | 9/2005 | Baran et al. |
| 2006/0004661 | A1 | 1/2006 | Bacon |
| 2006/0053442 | A1 | 3/2006 | Ridderheim et al. |

(Continued)

FOREIGN PATENT DOCUMENTS

| | | | |
|---|---|---|---|
| CN | 103020297 | B | 4/2013 |
| CN | 111901694 | B | 11/2020 |

(Continued)

OTHER PUBLICATIONS

U.S. Appl. No. 16/214,933, filed Dec. 10, 2018, Paul Joseph Hearty, Entire Document.

(Continued)

*Primary Examiner* — Nicholas T Corbo
(74) *Attorney, Agent, or Firm* — John L. Rogitz; John M. Rogitz

(57) ABSTRACT

Moving Picture Experts Group (MPEG) media transport protocol (MMTP) content is received from a source of content such as an ATSC 3.0 source. The MMTP content is used to construct as a Dynamic Adaptive Streaming over Hypertext Transfer Protocol (DASH) files. Constructing the file includes writing media processing units (MPU) header data, fragment header data, and MPU data. Constructing the media files also includes accounting for discarded Fragment Type 3 data in relation to a media data (MDAT) section of the DASH media files. Further, constructing the file includes appending digital rights management (DRM) data to the DASH MPD file. After the file has been constructed, a DASH software media player can play the media content using the file.

20 Claims, 9 Drawing Sheets

(56) References Cited

U.S. PATENT DOCUMENTS

| | | | |
|---|---|---|---|
| 2007/0098165 A1 | 5/2007 | Yoshikawa | |
| 2008/0168133 A1 | 7/2008 | Osborne | |
| 2009/0136203 A1 | 5/2009 | Stam et al. | |
| 2009/0296535 A1 | 12/2009 | Jones et al. | |
| 2011/0142139 A1 | 6/2011 | Cheng et al. | |
| 2012/0167133 A1 | 6/2012 | Carroll et al. | |
| 2012/0192220 A1 | 7/2012 | Wyatt et al. | |
| 2012/0307654 A1 | 12/2012 | Pantos et al. | |
| 2013/0007799 A1 | 1/2013 | Sandoval | |
| 2013/0326553 A1 | 12/2013 | Nicolas | |
| 2013/0332976 A1 | 12/2013 | Shenker et al. | |
| 2014/0325572 A1 | 10/2014 | Yie et al. | |
| 2015/0100996 A1 | 4/2015 | Freeman et al. | |
| 2015/0195327 A1 | 7/2015 | Bouazizi et al. | |
| 2015/0281770 A1* | 10/2015 | Lim | H04N 21/435 725/110 |
| 2015/0281799 A1 | 10/2015 | Lim | |
| 2016/0234348 A1 | 8/2016 | Mao et al. | |
| 2016/0234355 A1 | 8/2016 | Lee et al. | |
| 2016/0234682 A1 | 8/2016 | Mandyam | |
| 2016/0360288 A1 | 12/2016 | Mandyam et al. | |
| 2016/0366479 A1 | 12/2016 | Crowe et al. | |
| 2016/0373489 A1 | 12/2016 | Lee et al. | |
| 2017/0054520 A1 | 2/2017 | Kwak et al. | |
| 2017/0070789 A1 | 3/2017 | Liassides et al. | |
| 2017/0134763 A1 | 5/2017 | Hwang et al. | |
| 2017/0302982 A1 | 10/2017 | Simpson et al. | |
| 2017/0374429 A1 | 12/2017 | Yang | |
| 2018/0184136 A1 | 6/2018 | Oh et al. | |
| 2018/0205975 A1 | 7/2018 | Oh et al. | |
| 2018/0288468 A1 | 10/2018 | Yamagishi et al. | |
| 2018/0373847 A1 | 12/2018 | Lo et al. | |
| 2019/0058909 A1 | 2/2019 | Eyer et al. | |
| 2019/0058929 A1 | 2/2019 | Young et al. | |
| 2019/0174156 A1 | 6/2019 | Crawford et al. | |
| 2019/0215575 A1 | 7/2019 | Yang et al. | |
| 2019/0246148 A1 | 8/2019 | Oh et al. | |
| 2019/0356944 A1 | 11/2019 | Patel et al. | |
| 2020/0007922 A1 | 1/2020 | Yun | |

FOREIGN PATENT DOCUMENTS

| | | | |
|---|---|---|---|
| ES | 2955327 T3 | 11/2023 | |
| WO | 2016140479 A1 | 9/2016 | |
| WO | 2016178494 A1 | 11/2016 | |
| WO | 2016190720 A1 | 12/2016 | |
| WO | 2017184648 A1 | 10/2017 | |
| WO | 2018202768 A1 | 11/2018 | |

OTHER PUBLICATIONS

U.S. Appl. No. 16/275,078, filed Feb. 13, 2019, Charlemagne Aguilar Santos, Entire Document.

"RFC 4033, DNS Security Introduction and Requirements," Arends, R., Austein, R., Larson, M., Massey, D., and S. Rose, Internet Engineering Task Force, Fremont, CA, Mar. 2005.

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC 3.0 Standards", retrieved on Feb. 16, 2018 from https://www.atsc.org/standards/atsc-3-0-standards/.

"ATSC Candidate Standard Revision: Signaling, Delivery, Synchronization, and Error Protection", Doc. S33-1-893r4, Apr. 30, 2018.

"ATSC Standard: ATSC 3.0 Interactive Content (A/344)", May 2, 2019.

"ATSC Standard: ATSC 3.0 Interactive Content", Advanced Television Systems Committee, Dec. 18, 2017.

"ATSC Standard: ATSC 3.0 Security and Service Protection (A/360)", Aug. 20, 2019.

"ATSC Standard: ATSC 3.0 System (A/300)", May 15, 2020.

"ATSC Standard: Signaling, Delivery, Synchronization, and Error Protection (A/331)", Jun. 19, 2019.

"ATSCaster—ROUTE and MMTP server for ATSC 3.0", ENENSYS, Jul. 2018.

"ISO/IEC 23009-5:2017—Information technology—Dynamic adaptive streaming over HTTP (Dash)—Part 5: Server and network assisted DASH (SAND)", May 2017.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

I. Bouazizi, "MPEG Media Transport Protocol (MMTP)", Samsung Research America, Mar. 4, 2014.

Kim et al., "Method of DASH segments into a MMTP stream for switching contents under a hybrid broadcasting environment" (2017).

Xu et al., "DASH and MMT and their Applications", (2016).

Afzal, Samira & Esteve Rothenberg, Christian & Testoni, Vanessa & Kolan, Prakash & Bouazizi, Imed, "Multipath MMT-based approach for streaming high quality video over multiple wireless access networks", 2020, Computer Networks. 185. 107638. 10.1016/j.comnet.2020.107638.

"Streamline Your Video Delivery: RTMP to HLS Conversion", castr, Jul. 16, 2023, retrieved from https://castr.com/blog/rtmp-to-hls-conversion/.

Agnihotri et al., "ATSC 3.0 Playback Using MPEG Media Transport Protocol (MMTP)", file history of related U.S. Appl. No. 15/925,190, filed Mar. 19, 2018 (201705822.02-1168-922).

Tanmay Agnihotri, "Advanced Television Systems Committee (ATSC) 3.0 Latency-Free Display of Content Attribute", file history of related U.S. Appl. No. 16/710,746, filed Dec. 11, 2019. (201906112.01-1168-956).

* cited by examiner

800

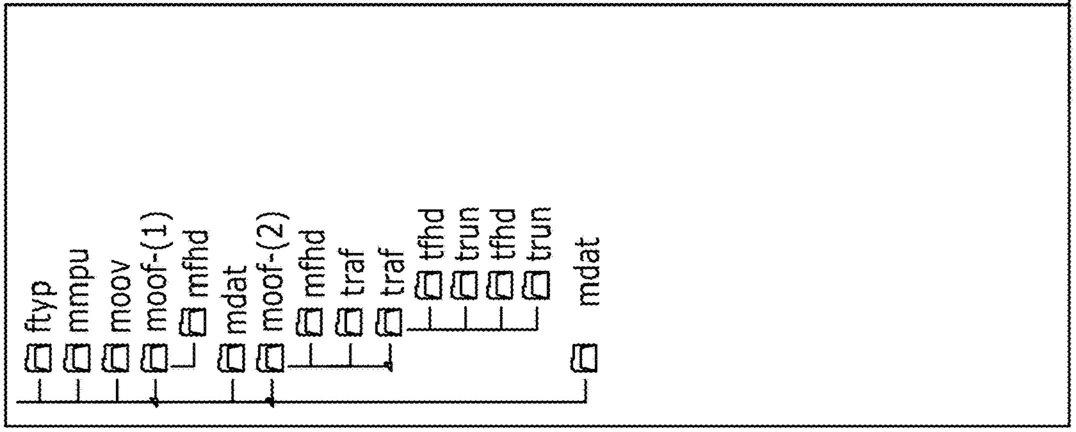

| Fields | Values |
|---|---|
| entries.0 | {"sample_size":63} |
| entries.1 | {"sample_size":63} |
| entries.2 | {"sample_size":63} |
| entries.3 | {"sample_size":63} |
| entries.4 | {"sample_size":63} |
| entries.5 | {"sample_size":63} |
| entries.6 | {"sample_size":63} |
| entries.7 | {"sample_size":63} |
| entries.8 | {"sample_size":63} |
| entries.9 | {"sample_size":63} |
| entries.10 | {"sample_size":63} |
| entries.11 | {"sample_size":63} |
| entries.12 | {"sample_size":63} |
| entries.13 | {"sample_size":63} |
| entries.14 | {"sample_size":63} |
| entries.15 | {"sample_size":63} |
| entries.16 | {"sample_size":63} |
| entries.17 | {"sample_size":63} |

FIG. 8

```
<MPD xmlns:xsi= 'http://www.w3.org/2001/XMLSchema-instance'
xmlns='urn:dash:schema:mpd:2011'
xsi:schemaloaction='urn:mpeg:dash:schema:mpd:2011 DASH-MPD.xsd' type='static'
profiles='urn:mpeg:dash:profile:isoff-live:2011
mediaPresentationDuration='PT5000000H0M30S'>
    <Period start='PT0S'>
       <AdaptationSet contentType="video" frameRate="1000000/16667" height="1080"
id="0" par="16:9" segmentAlignment="true" width="1920" codec='hev1'
mimeType='video/mp4' >
        <ContentProtection schemeIDUri="mpeg:dash:mp4protection:2011"
value="conc" cenc:default_KID="be244cb2-edf6-5853-92f7-c08a6c48fddf" />
        <ContentProtection
schemIDUri="urn:uuid:edef8ba9-79d6-4ace-a3c8-27dcd51d21ed">
<cenc:pssh>AAAAUXBzc2gAAAAA7e+LqXnWSs6jyCfc1R0h7qAAADEiE3NiZ19sYWJfY29udGlkX0FI4
9yVmwZqFGF0c2NfZ3JvdXAyX3Byb2ZpbGUyAAACb3Bzc2gAAAAA7e+LqXnWSs6jyCfc1R0h7QAAAk8iE3NiZ
19sYWJFY29udGVudGlkX0FI49yVmwZYAmoUYXRzY19ncm91cDJfcHJvZmlsZTJyWAoQJbE540E/VLmaqXhpz
0sKlxIQviRMsu32WFOS98CKbEj93xogb05dfU6QsCKAUAAZRNhXFPEgPa/FmopischUR019ZAiEHAtq1T2t
cCszMUZjoj1wV5yWAoQy2iecy8zU1uIDNihmKCkZRIQviRMsu32WF0S98CKbEj93xog0N7ubZuo37Ndyh8ge
nJtgzwOJIUK1uei496jeUIYESMiEGvq57GX/1fhVgR3xFDJ9ydyWAoQ5xqb90z6U5y+OmdPH2AhORIQ7T0XN
eCZX0uZRgChLQsWmxogVCGs/EmeXSqdbDJMiwVs2/S9DaiZEeGCdmfucF9ypDIiEOvFCtERXga05W7fORNIf
RZyWAoQCrGdFw/5UG+NDAOrZBQDlBIQ7T0XNeCZX0uZRgChLQsWmxog7N+XyMVJTdbsjdl95zFvBhwihRZDR
n8ke8Mvvfcjr6MiEJXTyO/weeBA5YHFRTGcaQtyWAoQplkZtXJzU2aV4nYEGZp7fbIQjA3XnZ7PXOKuq89mW
ZJT1Rogvyxi05DVdobiDZ/jrRkLpSd+NoI9Ma67sS1trnXXg1QiENXt/Lmi/h0O4xHGFvM2nplyWAoQeDksH
jc1UoiO4ClWEfJjfBIQjA3XnZ7PXOKuq89mWZJT1Rogz7Vr9BLnYzcLybDQH1Y3dGeCkbAcpNKgf+DQmIdzl
+giEG/2ws7/ON0wtcYHvFObClI=</cenc:pssh>
            <dashif:Laur1 licenseType="license-1.0"
xmlns:dashif="http://dashif.org/guidelines/ContentProtection">https://drm-license.a3
sa.yottacloud.tv/v1/wv/license?content_id=sbg_lab_contentid_A</dashif:Laurl>
       </ContentProtection>
      <Role schemeIdUri='urn:mpeg:dash:role:2011' value='main' />
       <BaseURL>http://10.27.1.146/MMT_DRM/MMTP_VIDEO_try.mp4</BaseURL>
       <Representation id='Video1.1.1.1' />
     </AdaptationSet>
   </Period>
</MPD>
```

FIG. 9

ATSC 3.0 PLAYBACK OF ENCRYPTED MMT MEDIA THROUGH CONSTRUCTION OF DASH FILE

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top").

However, as recognized herein, an issue has arisen in that a new specification has been implemented for ATSC 3.0 to encrypt media transport protocol (MMTP) data using Widevine. This presents a problem for software-based media players with which many televisions and other devices come equipped. This is because those software-based media players cannot play MMTP content themselves, much less can they do so according to the way in which the MMTP content is transmitted—media first and then header data subsequent to that. There are currently no adequate solutions to the foregoing computer-related, technological problem.

SUMMARY

As understood herein, the use of either dynamic adaptive streaming over hypertext transfer protocol (DASH) or MMTP for media playback means that the media processor of the media player that is to play back the broadcast media cannot advantageously be "agnostic" to the protocol it processes. Thus, multiple media players otherwise would be required absent present principles. As also understood herein, the use of the ROUTE protocol for DASH playback cannot advantageously be re-used for MMTP playback. Accordingly, the techniques described herein are provided to facilitate use of a single media player, namely, a DASH media player for MMTP playback in light of the aforementioned new specification for ATSC 3.0 to encrypt media transport protocol (MMTP) data using Widevine as well as other developments in the ATSC 3.0 standard.

However, while the description herein uses ATSC 3.0 as an example, it is to be understood that present principles apply to MMTP playback in general.

As set forth in more detail below, present principles convert MMTP data into DASH protocol for playback. This enables the reuse of a DASH media player for MMTP playback and enables the media processor to be agnostic of the particular protocol being used for transport.

It is to also be understood consistent with present principles that signaling and other ATSC 3.0 content may be conveyed in audio/video/captions files. Such a file/circular buffer is formatted in accordance with the DASH protocol. Therefore, when a player starts playback of ATSC 3.0 content, the audio/video/captions file or buffer is parsed by the player and playback starts as per DASH protocol.

Accordingly, in one aspect, a media playback apparatus includes at least one computer memory that is not a transitory signal. The computer memory (e.g., a computer-readable storage medium) includes instructions executable by a processor system to receive Moving Picture Experts Group (MPEG) media transport protocol (MMTP) content from a source of content. The instructions are also executable to use the MMTP content to construct a Dynamic Adaptive Streaming over Hypertext Transfer Protocol (DASH) Media Presentation Description (MPD) file, with the DASH file indicating DASH content. The instructions are also executable to access the DASH MPD file to play the DASH content using a DASH player. Constructing the DASH files includes writing, for the DASH file and using the MMTP content, all three of media processing units (MPU) header data, fragment header data, and MPU data. Constructing the DASH media files also includes accounting for discarded Fragment Type 3 data in relation to a media data (MDAT) section of the DASH media files. Constructing the DASH files further includes appending digital rights management (DRM) data to the DASH MPD file being constructed.

In one example implementation, the instructions may be executable to account for the discarded Fragment Type 3 data by reducing an amount of bytes indicated in the MDAT section of the DASH media files compared to an amount of bytes indicated in an MDAT section of the MMTP content. Additionally or alternatively, the instructions may be executable to account for the discarded Fragment Type 3 data by adding zeros at the end of Fragment Type 2 data of the DASH media files being constructed.

Still further, in various specific examples, the instructions may be executable to write first, for the DASH media files and using the MMTP content, the MPU header data. The instructions may then be executable to write second, for the DASH media files and using the MMTP content, the fragment header data. After that, the instructions may be executable to write third, for the DASH media files and using the MMTP content, the MPU data. The MPU data may include audio data and/or video data.

If desired, in some instances the media playback apparatus may include the processor system.

Also, in certain non-limiting examples, the source of content may include an Advanced Television System Committee (ATSC) 3.0 system source.

Still further, in certain instances the instructions may be executable to receive the MMTP content from a MMTP delivery channel and to extract the MMTP content from user datagram protocol (UDP) data from the delivery channel to construct the DASH files.

What's more, in some instances the instructions may be executable to play the DASH content using the DASH player.

In another aspect, a method includes receiving Moving Picture Experts Group (MPEG) media transport protocol (MMTP) content from a source of content. The method also includes using the MMTP content to construct a Dynamic Adaptive Streaming over Hypertext Transfer Protocol (DASH) Media Presentation Description (MPD) file, with the DASH file indicating DASH content. The method then includes accessing the DASH MPD file to play the DASH content using a DASH player. As for constructing the DASH media files, this includes writing, for the DASH file and using the MMTP content, all three of media processing units (MPU) header data, fragment header data, and MPU data. Constructing the DASH media files also includes accounting for discarded Fragment Type 3 data in relation to a media data (MDAT) section of the DASH file, and appending digital rights management (DRM) data to the DASH MPD file being constructed.

In still another aspect, an apparatus includes a processor system and at least one computer storage including instructions executable by the processor system. The instructions are executable to receive Moving Picture Experts Group (MPEG) media transport protocol (MMTP) content from a source of content. The instructions are also executable to use the MMTP content to construct a Dynamic Adaptive Streaming over Hypertext Transfer Protocol (DASH)) Media Presentation Description (MPD) file, with the DASH file indicating DASH content. The instructions are further executable to access the DASH MPD file to play the DASH content using a DASH player. Constructing the DASH file includes writing, for the DASH media files and using the MMTP content, all three of media processing units (MPU) header data, fragment header data, and MPU data. Constructing the DASH media files also includes accounting for discarded Fragment Type 3 data in relation to a media data (MDAT) section of the DASH media files. Constructing the DASH MPD file also includes appending digital rights management (DRM) data to the DASH file being constructed.

The details of the present application, both as to its structure and operation, can best be understood in reference to the accompanying drawings, in which like reference numerals refer to like parts, and in which:

BRIEF DESCRIPTION OF THE DRAWINGS

FIG. 8 is an example graphical user interface (GUI) showing trun fields which indicate Fragment Type 3 sample sizes for which to account consistent with the logic of FIG. 7; and FIG. 9 shows example extensible markup language (XML) code that may be executed to write DRM data into the DASH MPD file being constructed consistent with present principles.

DETAILED DESCRIPTION

Figure 1:
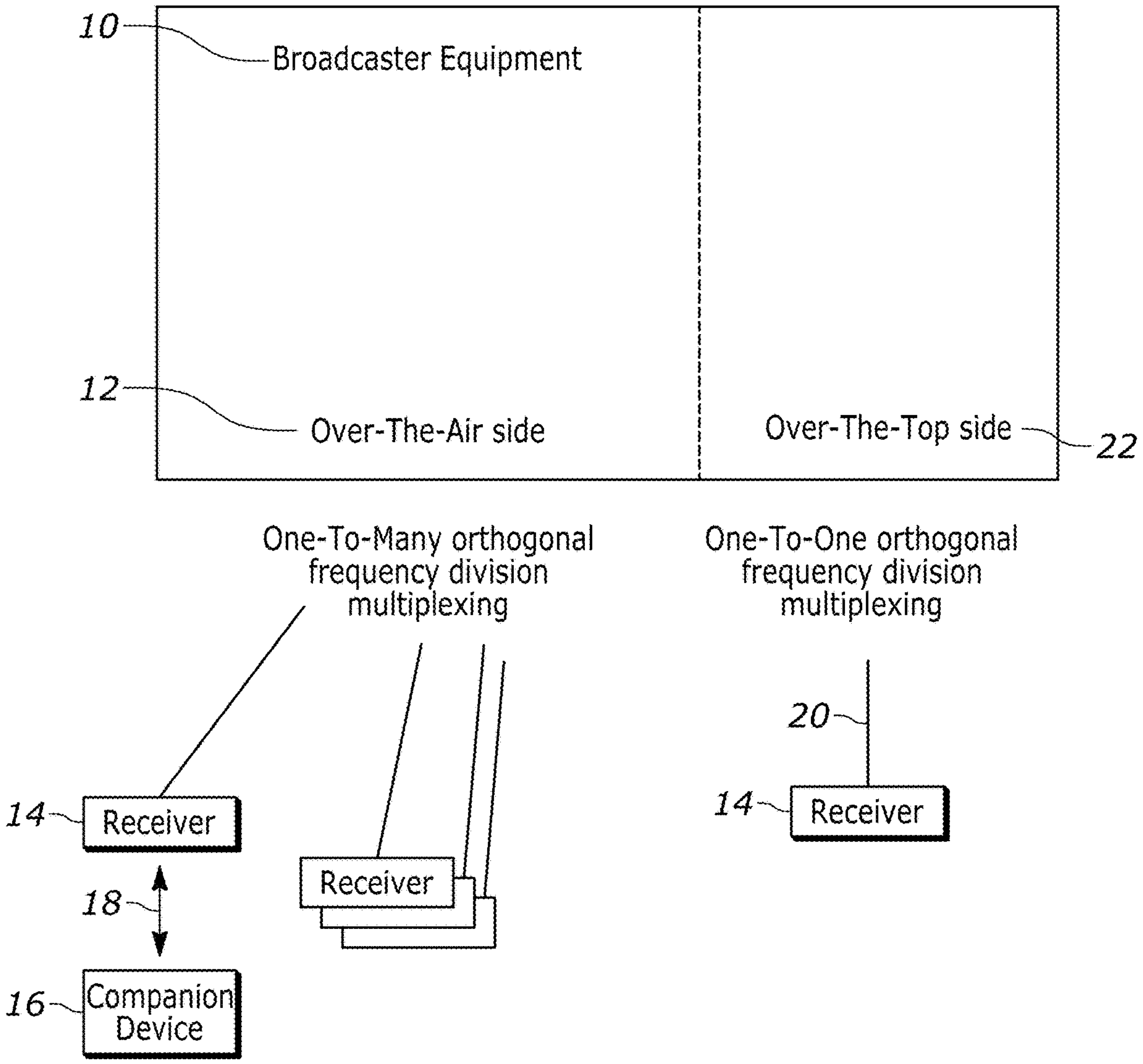
FIG. 1 is a block diagram of an example system including an example in accordance with present principles.

This disclosure incorporates by reference the subject matter disclosed in the specifications of U.S. Pat. Nos. 11,044,294 and 11,606,528.

This disclosure relates to technical advances in digital television, such as in Advanced Television Systems Committee (ATSC) 3.0 television. More particularly, present principles provide for a mechanism of playback of encrypted MMT media data using current software players like ExoPlayer on Android, with it being further noted that MMT is an open protocol that many software players do not support. Accordingly, signaling and media data may be translated such that media playback can be carried out using DASH software players that support encryption, like ExoPlayer and other software players, enabling playback of encrypted content received in MMT protocol using DASH software players. Present principles may also be used for other software architectures such as HLS and SS. Present principles may therefore be ported to various software decoder platforms.

An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits consistent with present principles can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "a" or "an" in reference to an entity refers to one or more of that entity. As such, the terms "a" or "an", "one or more", and "at least one" can be used interchangeably herein.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. A receiver 14 may have both non-persistent memory such as certain types of solid-state RAM and persistent memory such as flash. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
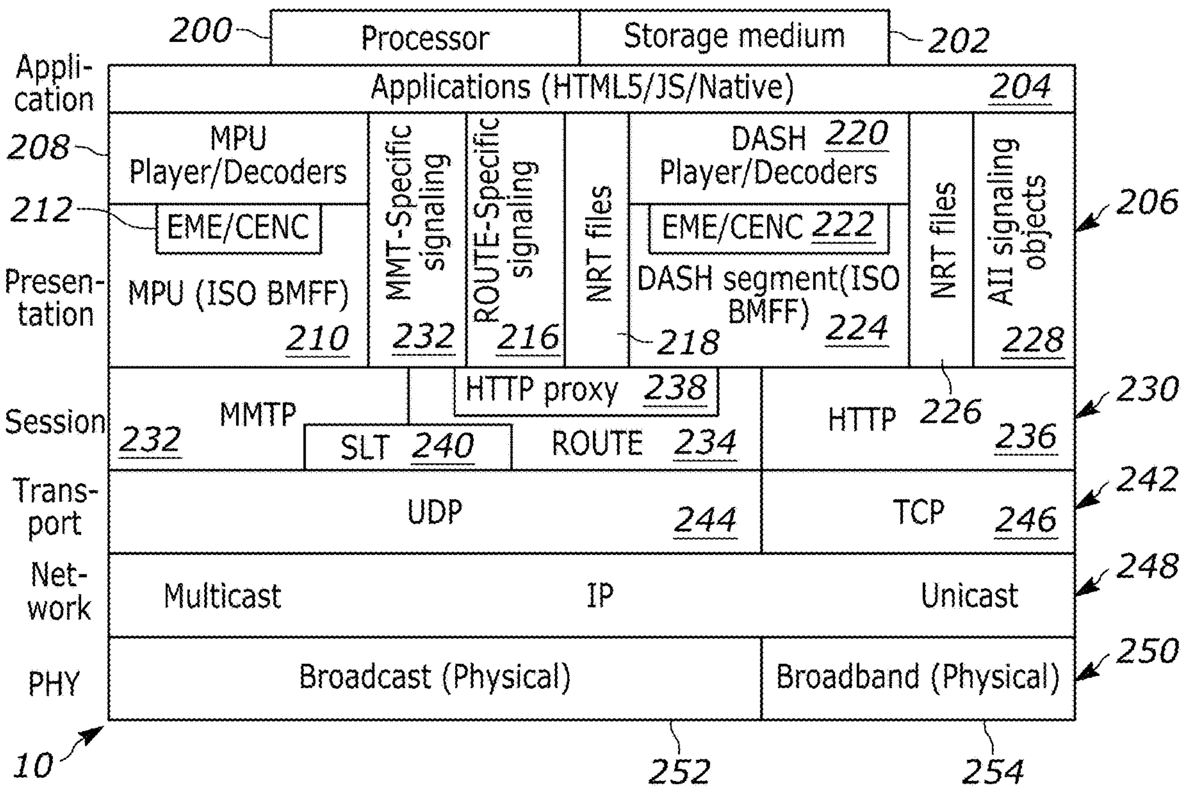
FIG. 2 is a block diagram of a specific example system consistent with present principles.
Figure 2:
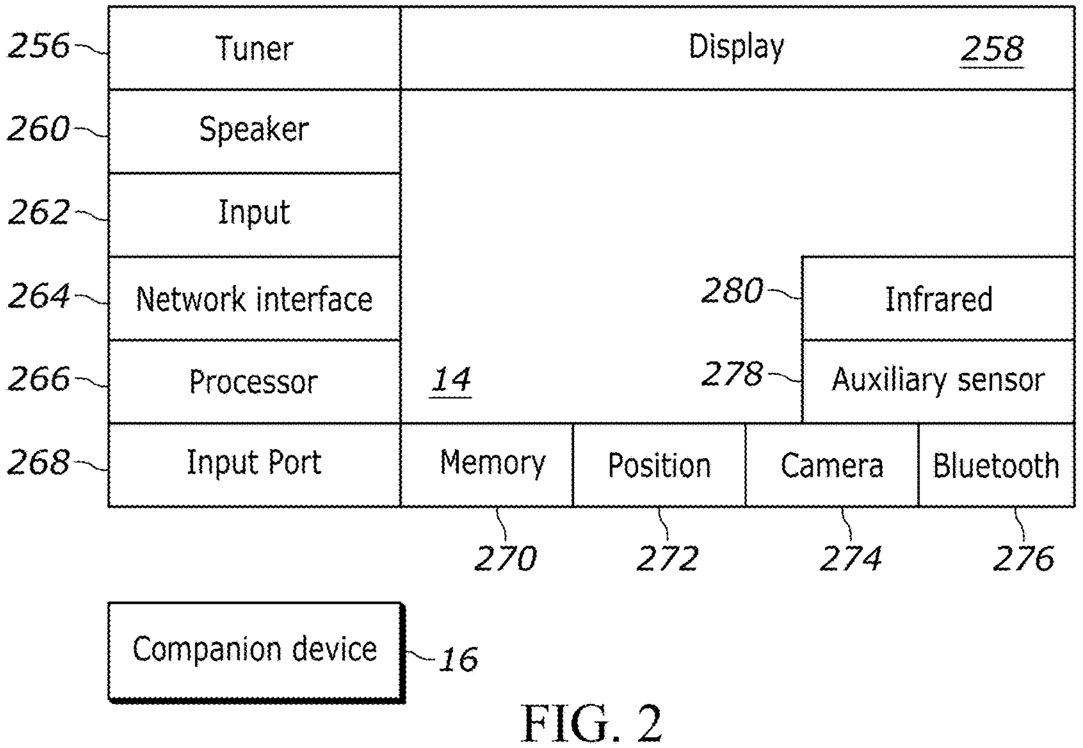

Referring now to FIG. 2, details of example components shown in FIG. 1 may be seen. FIG. 2 illustrates an example of the broadcaster equipment 10 in terms of a protocol stack that may be implemented by a combination of hardware and software. Using the ATSC 3.0 protocol stack, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to execute one or more software applications in a top level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as media processing units (MPU) 208 that decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including a Motion Picture Experts Group (MPEG) media transport protocol (MMTP) signaling module 214 and a real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226, and may also include signaling objects 228 for providing playback signaling.

Below the presentation layer 206 in the protocol stack is a session layer 230. The session layer 230 includes, on the broadcast side, MMTP protocol 232 and ROUTE protocol 234. MMTP wraps the ISO BMFF files with metadata for broadcast delivery. MMTP may contain pointers to signaling components that identify physical layer pipes (PL), each of which may be thought of as a separate video stream configured for a particular receiver type with source and destination identification information. Other signaling components may be provided to aid in the playback of the audio video content.

On the broadband side the session layer 230 includes HTTP protocol 236 which may be implemented as HTTP-secure (HTTPS). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) may be included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets and/or machine access code (MAC) format packets to be suitable to be transported over the relevant medium, and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH-industry forum (IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g.

receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
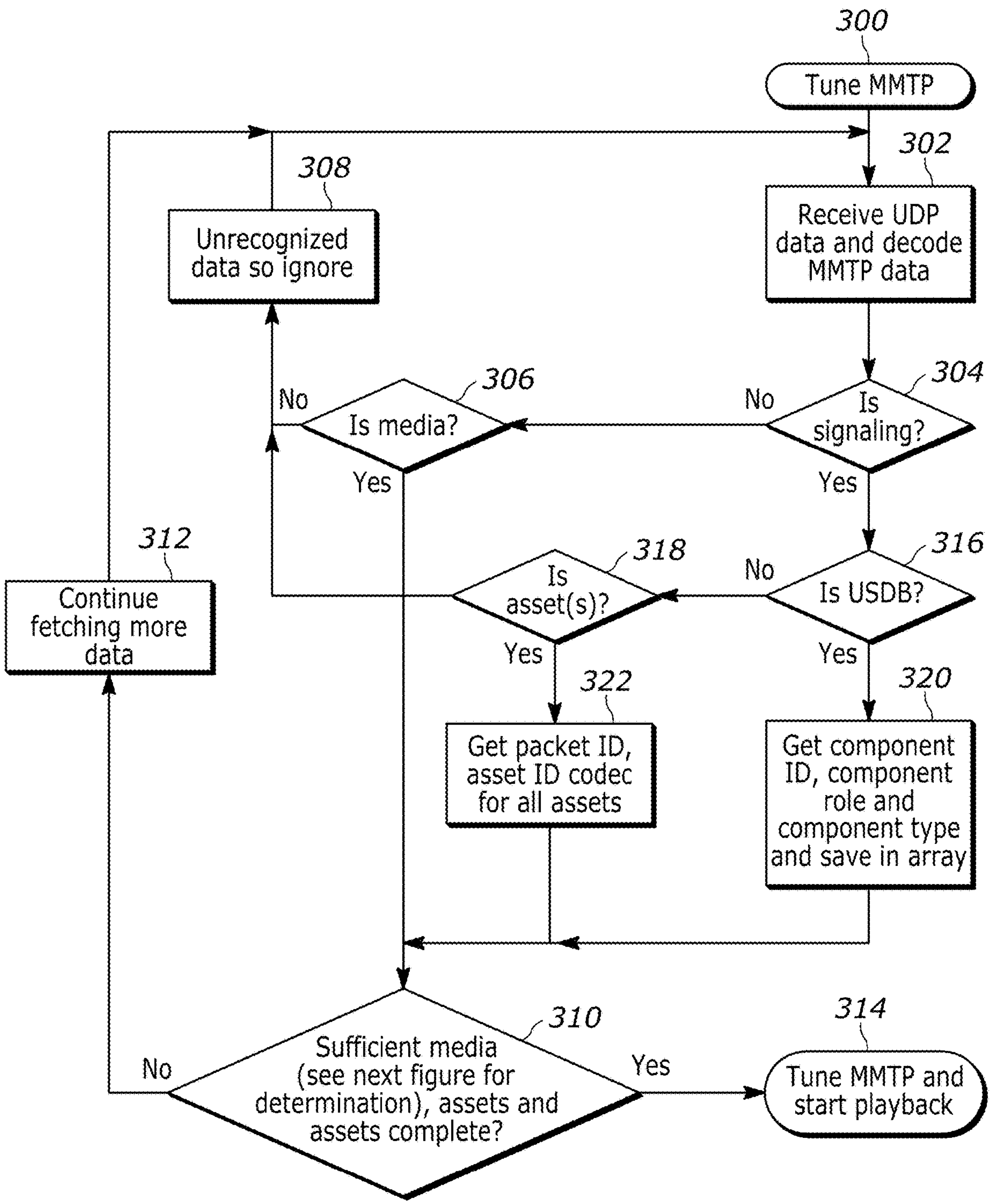
FIG. 3 is a flow chart of example MMTP-to-DASH translation logic consistent with present principles.

FIG. 3 illustrates example logic consistent with present principles that may be employed by, e.g., the media player 204 in FIG. 3. Commencing at block 300, an MMTP delivery channel is tuned to. Proceeding to block 302, user datagram protocol (UDP) data from the tuned-to channel is received and the MMTP data is extracted from the transport layer (UDP messages).

Decision diamond 304 indicates that the type of the extracted data is identified, and if the type of data is not identified by the receiver as signaling data, the logic can move to decision diamond 306 to identify whether the data is media data. Note that signaling data typically provides information for discovery and acquisition of services and related content components, and thus on this basis may be distinguished from the media data itself. If the data is not media, the data is unrecognized at state 308 and ignored, and the process loops back to block 302.

However, if the type of data is media data, the logic stores the media data and moves to decision diamond 310 to determine whether sufficient media along with requisite assets (such as an appropriate codec) has been received to start playback of the media, as discussed further below in reference to FIG. 4. Once requisite assets have been received a DASH audio/video/captions file/circular buffer is created based on the information received in the Assets and USDB.

If sufficient media has not been received to start playback, or if the requisite attendant assets to play the media are not found, the logic continues to fetch more data at state 312 by looping back to block 302. On the other hand, when it is determined at decision diamond 310 that sufficient media exists to start playback and that the needed assets are available, the logic moves to block 314 to tune to the MMTP channel and indicate that MMTP acquisition is complete, and to start playback of the media using the DASH player 212 or to indicate as by a message presented on the display of the device that playback may be commenced.

Returning to decision diamond 304, if it is determined that data being received is identified as signaling, the logic may move to decision diamond 316 to identify whether the data is user service description block (USDB) data. If not, the logic may move to decision diamond 318 to determine whether the data indicates an asset that is within a set of known or expected assets. If the data is neither USDB nor an asset the data is unrecognized and so the process loops back to block 302.

However, if the data is recognized at decision diamond 316 as being USDB, the logic moves to block 320 to obtain from the data the component ID, role, and type indicated by the USDB data are identified and saved in a component array. If the data is recognized as asset data at decision diamond 318, the logic moves to block 322 to obtain, from the data, the packet ID, asset ID, and associated codec of the assets identified in diamond 318. These data components are identified and saved. From block 320 or 322 the logic proceeds to decision diamond 310, described above.

If desired, the logic may determine whether the count of all assets equals a predefined or known component array size.

Figure 4:
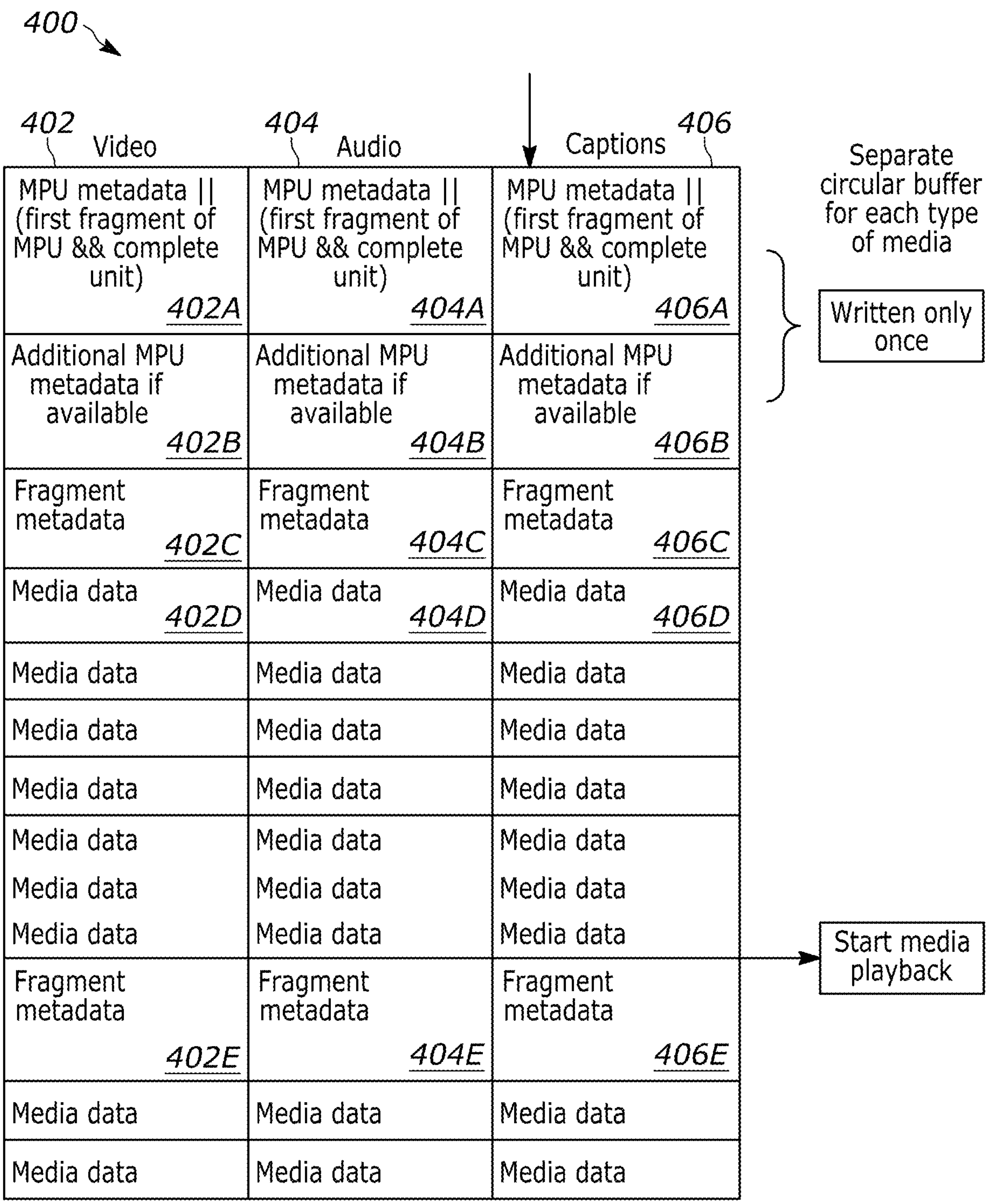
FIG. 4 is a schematic diagram of example data structures implemented as circular buffers for each type of media to be played back (e.g., video, audio, and captions)

FIG. 4 schematically illustrates a data structure 400 in which media data converted from MMTP to DASH may be stored, establishing a DASH audio/video/captions file or buffer consistent with present principles. It is to be understood that accompanying assets such as codecs received in FIG. 3 may be stored and linked to the media data.

Video data may be stored in a video circular buffer represented by the column 402, audio data may be stored in an audio circular buffer represented by the column 404, and caption (text) data may be stored in a caption circular buffer represented by the column. Each of the separate circular buffers may contain a respective initial block 402A, 404A, 406A of MPU metadata, including the first fragment of MPU data plus a complete unit of such data, followed by any additional MPU metadata 402B, 404B, 406B if available. This data typically is written only once to the data structure.

Following the metadata, fragment metadata 402C, 404C, and 406C may be provided, following which are blocks 402D, 404D, and 406D of media (video, audio, and caption) in each respective circular buffer). For subsequent fragments in the buffer, fragment metadata 402E, 404E, 406E may be recorded followed by associated media data as shown. Media playback on a fragment-by-fragment basis typically is commenced upon encountering the associated metadata.

Also note in terms of 406C that, in some examples, Type 3 fragment metadata may be discarded from/not included in the DASH media file. However, the Type 3 fragment metadata may still be accounted for in the DASH media file itself, such as by adding zeros and/or changing the MDAT header as described below.

With the above in mind, it may now be appreciated that the determination of whether sufficient assets and media exists for playback at decision diamond 310 in FIG. 3 may access the data structure in FIG. 4 to determine whether sufficient media fragments and ensuing media blocks exist to commence playback. In making this determination, a threshold amount of media data may be used to compare with existing stored data to determine whether the existing stored data exceeds the threshold and, if so, a positive determination can be returned at decision diamond 310.

Figure 5:
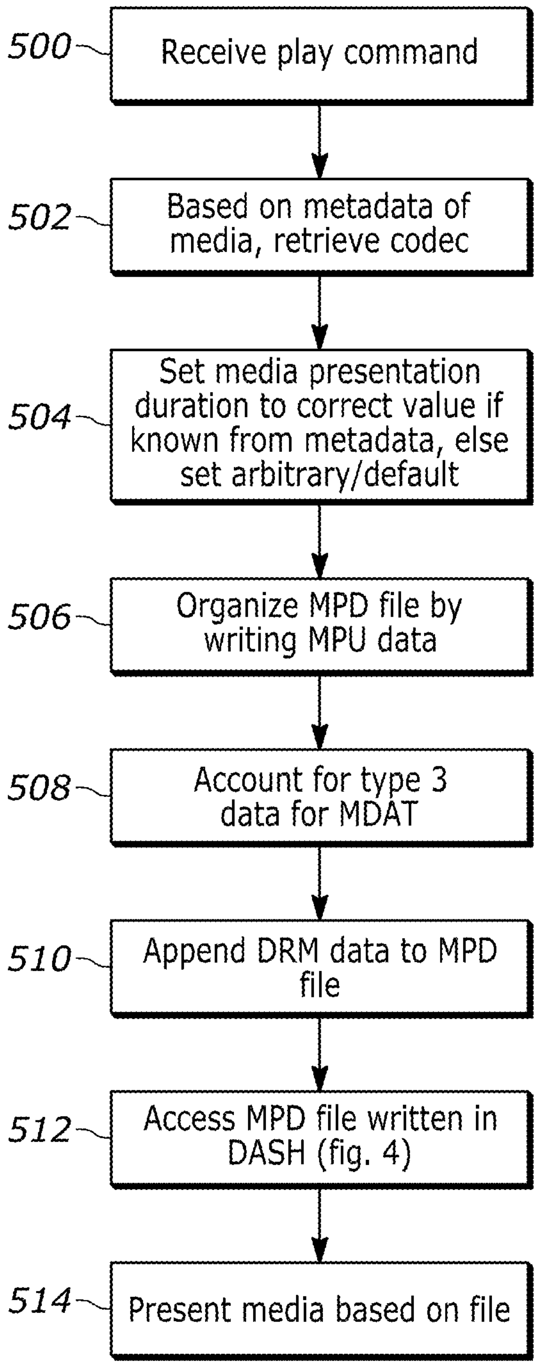
FIG. 5 is a flow chart of example media play logic consistent with present principles.

FIG. 5 illustrates additional example logic. Commencing at block 500, a play command is received, e.g., by a user selecting a play selector or speaking "play". Moving to block 502, the data structure of FIG. 4 may be accessed to retrieve the appropriate codec for the demanded media based on the codec indicated in the associated metadata.

Proceeding to block 504, the duration for media presentation may be set to the correct value if known (e.g., from the metadata) or to an arbitrary default period. From block 504 the logic proceeds to block 506.

Figure 6:
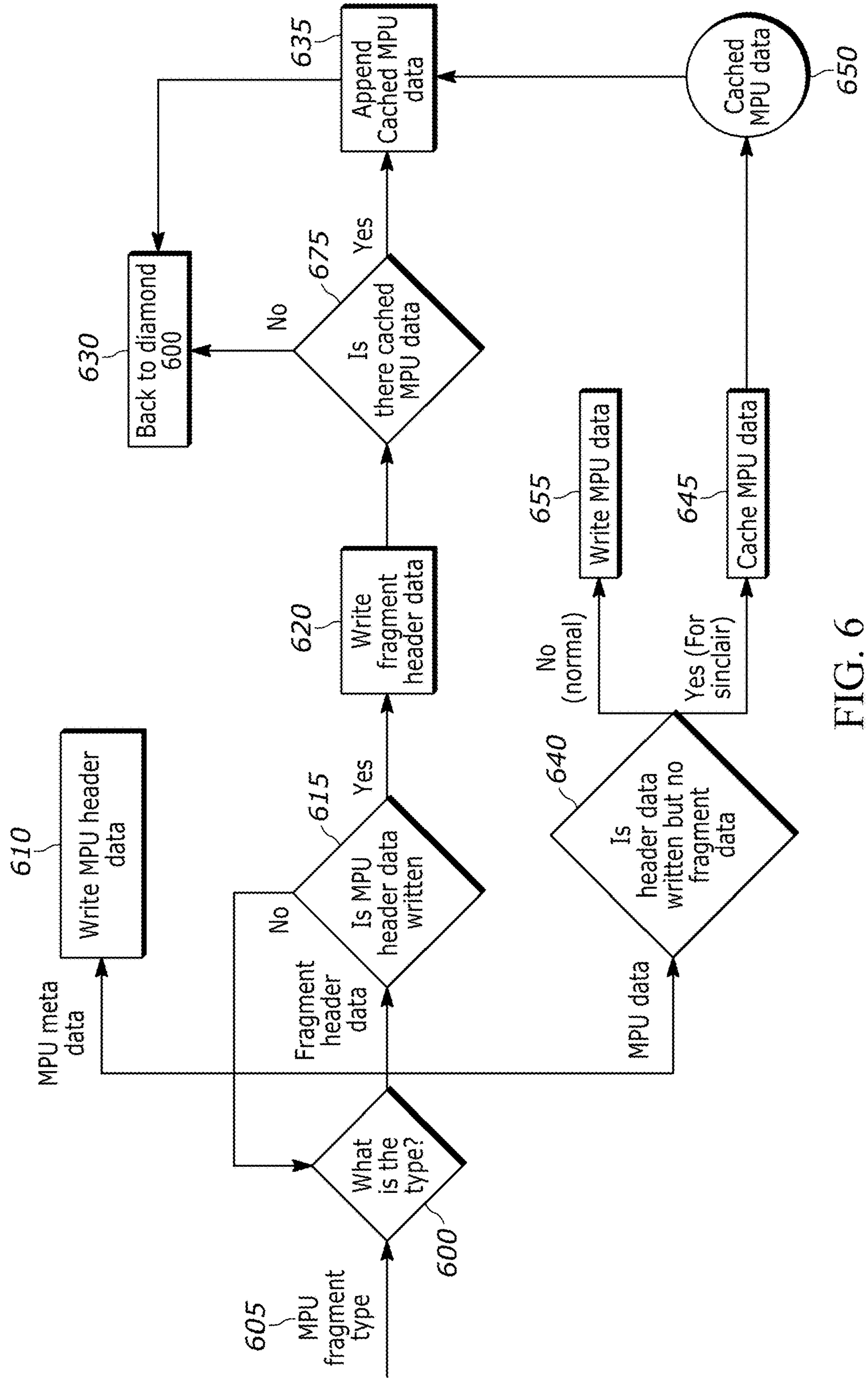
FIG. 6 is a flow chart of example logic consistent with present principles for writing, for a DASH media file and using MMTP content, media processing units (MPU) header data, fragment header data, and MPU data.

At block 506 a DASH audio/video/captions file/circular buffer is constructed/organized together in fragmented format consistent with the logic of FIG. 6 and structure of FIG. 4, thereby taking audio/video data that was received out of order per ATSC 3.0 broadcasting standards and rearranging it in order. Then, at block 510, digital rights management (DRM) data is appended to the MPD file to protect the MMTP data. The logic of FIG. 5 continues to block 512 where the media data in DASH format (the constructed audio/video/captions circular buffer/file) is accessed as constructed in the data structure of FIG. 4 to then be presented at block 514.

Now in reference to FIG. 6, this figure shows additional logic that may be executed in conjunction with the logic of FIG. 5 to construct an audio/video/captions circular buffer or file according to the structure of FIG. 4 in fragmented format consistent with present principles. The logic of FIG. 6 may therefore be executed by a media player application ("app"), such as a DASH player, or other media playback apparatus software.

The logic begins at decision diamond 600 where an MPU fragment type 605 is identified for MMTP fragment data that has been received from an ATSC 3.0 broadcasting apparatus. Fragment types include MPU metadata, fragment header data, and MPU data (e.g., the media data itself, such as video, audio, and/or closed captioning data). Accordingly, responsive to a determination at diamond 600 that the incoming, received fragment type is MPU metadata, the logic proceeds to block 610 to write the MPU header data, in DASH, into a media file header for the media file that is being constructed in MP4 format based on the received MMTP data.

However, responsive to a determination at diamond 600 that the incoming MPU fragment type is fragment header data, the logic instead proceeds from diamond 600 to decision diamond 615. At diamond 615 it is determined whether MPU header data has been written. A negative determination at diamond 615 causes the logic to revert back to diamond 600 to proceed again therefrom, with the received fragment header data being cached in the interim (e.g., in RAM) to eventually be written to the audio/video/captions buffer/file under construction as described herein, but after the MPU header data has been written. However, an affirmative determination at diamond 615 instead causes the logic to proceed to block 620 where fragment header data is written, in DASH, to the audio/video/captions file being constructed.

From block 620 the logic then proceeds to decision diamond 625 where it is determined whether cached MPU data (media data) exists already. A negative determination at diamond 625 causes the logic to proceed to block 630 where the logic reverts back to diamond 600 to proceed again therefrom. However, responsive to an affirmative determination at diamond 625, the logic instead proceeds to block 635 where the cached MPU data is appended to the file under construction if not done already (with the partially-constructed file now having the MPU header data written at block 610 and the fragment header data written at block 620). The cached MPU data that is appended to the file will eventually be written into the file itself as set forth below. From block 635 the logic then proceeds back to diamond 600 to continue again responsive to receipt of additional fragmented MMTP data to be incorporated into the same file under construction.

Referring back to diamond 600 again, if it is determined that the incoming MPU fragment type is MPU data (media data), the logic instead proceeds from diamond 600 to decision diamond 640. At diamond 640 it is determined whether MPU header data has already been written but not fragment header data for the file under construction (and/or if neither has been written). An affirmative determination at diamond 640 that MPU header data has been written but not fragment header data (and/or that neither has been written) causes the logic to proceed to block 645 where the received MPU data is cached (e.g., in RAM). From block 645 the logic then proceeds to step 635 where the cached MPU data 650 from step 645 is appended to the file under construction (e.g., appended to the circular buffer after other already-received MPU data that has also been appended to the same buffer).

Referring back to diamond 640, note that a negative determination at diamond 640 (a determination that both MPU header data and fragment header data have already been written to the file under construction) instead causes the logic to proceed to block 655 where the MPU data that has been received is written, in DASH, to the file to thus establish a complete audio/video/captions file or buffer structure per FIG. 4 as written in DASH.

Thus, it may be appreciated that a circular buffer file in text format may be constructed from MMTP data from an ATSC 3.0 broadcaster according to FIG. 6, with MPU header data being written first, then the fragment head data, and last the MPU data (media data itself) so that a DASH media player can play out the media. This occurs despite the ATSC 3.0 broadcaster potentially sending the MPU (media) data first before the MPU header data and fragment header data so that the latter two, when received out-of-order after the MPU (media) data, can be written to the buffer before the MPU (media) data itself so that the complete audio/video/captions buffer file as written in DASH can ultimately be accessed at block 512 of FIG. 5 to then be presented at block 514 using a DASH player.

Accordingly, it may be appreciated according to present principles that, advantageously, MMTP data received out of order from the ATSC 3.0 broadcaster (owing to historic hardware decoder prioritization) may still be used to construct a circular buffer written in DASH. This, in turn, enables playout using a DASH software media player/decoder even when the MMTP data provided out-of-order and over-the-air is encrypted using Widevine DRM or other DRM protocol (by first having the DRM data from the header available to decrypt the MPU (media) data itself).

However, further note that in addition to organizing/constructing the circular buffer according to block 506 and the logic of FIG. 6 above, additional steps are to be taken prior presenting the media of the buffer file at block 514. This includes the step mentioned at block 406C from FIG. 4, where Type 3 Fragment data is accounted for in the fragment metadata section of the circular buffer. Example logic for doing so is shown in FIG. 7, with it being further recognized that the ATSC 3.0 standard adds MPU Fragment Type 3 data in ATSC 3.0 broadcasts.

Figure 7:
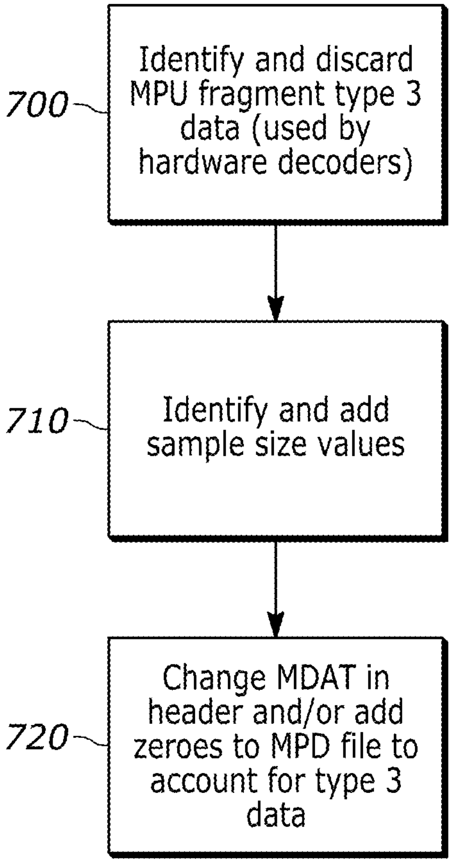
FIG. 7 is a flow chart of example logic consistent with present principles for accounting for discarded Fragment Type 3 data in relation to a media data (MDAT) section of a DASH media file being constructed.

With reference to FIG. 7, at block 700 MPU Fragment Type 3 data is identified in the received MMTP data and discarded. MPU Fragment Type 3 data may include mhas which defines the data for decrypting out-of-order packets. This data may be discarded because software players like DASH players do not support this even though hardware decoders do. However, present principles recognize that the size of the Type 3 data is still added to the mdat size in the MPU Fragment Type 1 as received from the broadcaster. With the foregoing in mind, from block 700 the logic then proceeds to block 710.

At block 710 the sample size values for the Type 3 data is identified and added together/summed up. The values may be identified from the Type 3 data itself that was discarded.

Additionally or alternatively, to also calculate the size of the data in MPU Fragment Type 3, the values/size may be identified from the trun box of the second traf box in the MPU Fragment Type 1 data (part of the MP4 header). An example of this second approach is illustrated via FIG. 8, which shows a fields list and the corresponding sample size values in a graphical user interface (GUI)/file browser 800. Thus, the individual values as indicated in the trun box may be used to calculate the sum of all the sample_size present in the Type 3 data.

Still in reference to FIG. 7, from block 710 the logic then proceeds to block 720. At block 720 one or two different things may happen to account for the size of the Type 3 data. As a first example, 0x00 for the size of the MPU Fragment Type 3 data may be appended to the fragment metadata section that was constructed pursuant to FIG. 6. Thus, zeros may be appended at the end of the Fragment Type 2 data (after the last data segment of the Fragment Type 2 data itself) that together have a byte size equal to the sum of the size of the Type 3 data. The zeros may therefore be appended below the last media data for the file, at the fragment metadata section. This way, the size of the data structure may be maintained (as reflected in the received mdat) so that software decoders consistent with present principles will still work without any issue (e.g., since those players might not otherwise know what to do with the inconsistency between the indicated mdat size and actual file size without the zeros being added in place of the Type 3 data that has been discarded).

As a second example to also allow the software decoder to properly function, at block 720 all the Fragment Type 1 data of the MMTP file may be parsed to find the mdat box. The indicated mdat size (data) in the mdat box may then be reduced by the size of the Type 3 data (e.g., as calculated using the trun box as described above). Thus, if the original mdat size were 150 bytes, for example, the indicated mdat size may be reduced to 100 bytes to not confuse the DASH player.

Either of the above examples may work (e.g., add zeros and/or reduce mdat size) to thus create a DASH audio/video/captions file which can be decoded/decrypted by a software player like Exoplayer.

As indicated above, in addition to organizing/constructing the file according to block 506 and the logic of FIG. 6, and after accounting for Fragment Type 3 data according to 406C and the logic of FIG. 7, another action may be taken prior presenting the media at block 514. This includes the step of block 510 from FIG. 5, where Widevine DRM data is appended/inserted into the constructed MPD file. The Widevine DRM data may be written into the file being created for the DASH player to know the media content is encrypted and to know how to decrypt the media content.

The DRM data written into the MPD file at block 510 (e.g., written into the header) may therefore indicate that the MMTP file is protected via DRM and is encrypted. The data written into the MPD file at block 510 may also include a uniform resource locator (URL) or other link for the software player to download the decryption key needed to decrypt the DRM-protected media data. Also note that the DRM data written into the MPD file may be sourced from the received ATSC 3.0 broadcast packets themselves, which contain signaling data indicating the existence of the DRM data.

Example extensible markup language (XML) is reproduced below and is also shown in FIG. 9. This code may be executed to write the DRM data into the MPD file.

```
<MPD xmlns:xsi='http://www.w3.org/2001/XMLSchema-instance'
xmlns='urn:mpeg:dash:schema:mpd:2011'
xsi:schemalocation='urn:mpeg:dash:schema:mpd:2011' DASH-MPD.xsd' type='static'
profiles='urn:mpeg:dash:profile:isoff-live:2011'
mediaPresentationDuration='PT5000000H0M30S'>
    <Period start='PT0S'>
        <AdaptationSet contentType="video" frameRate="1000000/16667"
height="1080" id="0" par="16:9" segmentAlignment="true" width="1920" codecs='hev1'
mimeType='video/mp4'>
            <ContentProtection schemeIdUri="urn:mpeg:dash:mp4protection:2011"
value="cenc" cenc:default_KID="be244cb2-edf6-5853-92f7-c08a6c48fddf" />
            <ContentProtection schemeIdUri="urn:uuid:edef8ba9-79d6-4ace-a3c8-
27dcd51d21ed">
<cenc:pssh>AAAAUXBzc2gAAAAA7e+LqXnWSs6jyCfc1R0h7QAAADEiE3NiZ19sY
WJfY29udGVudGlkX0FI49yVmwZqFGF0c2NfZ3JvdXAyX3Byb2ZpbGUyAAACb3Bzc
2gAAAAA7e+LqXnWSs6jyCfc1R0h7QAAAk8iE3NiZ19sYWJfY29udGVudGlkX0FI49
yVmwZYAmoUYXRzY19ncm91cDJfcHJvZmlsZTJyWAoQJbE540E/VLmaqXhpz0sKlx
IQviRMsu32WFOS98CKbEj93xogb05dfU6QsCKAUAAZRdNhXFPEgPa/FmopischUR
O19ZAiEHAtq1T2tcCszMUZjoj1wV5yWAoQy2iecy8zU1uIDNihmKCkZRIQviRMsu32
WFOS98CKbEj93xog0N7ubZuo37Ndyh8genJtgzwOJIUK1uei496jeUIYESMiEGvq57G
X/lfhVgR3xFDJ9ydyWAoQ5xqb90z6U5y+OmdPH2AhORIQ7T0XNeCZX0uZRgChLQs
WmxogVCGs/EmeXSqdBDJMiwVs2/S9DaiZEeGCdmfucF9ypDIiEOvFCtERXga05W7f
ORNIfRZyWAoQCrGdFw/5UG+NDAOrZBQDlBIQ7T0XNeCZX0uZRgChLQsWmxog
7N+XyMVJTdBsjdl95zFvBhwihRZDRn8ke8Mvvfcjr6MiEJXTyO/weeBA5YHFRTGcaQ
```

-continued

```
tyWAoQplkZtXJzU2aV4nYEGZp7fBIQjA3XnZ7PXOKuq89mWZJT1Rogvyxi05DVdob
iDZ/jrRkLpSd+NoI9Ma67sS1trnXXg1QiENXt/Lmi/h004xHGFvM2nplyWAoQeDksHjcl
UoiO4C1WEfJjfBIQjA3XnZ7PXOKuq89mWZJT1Rogz7Vr9BLnYzcLybDQH1Y3dGeC
kbAcpNKgf+DQmIdzl+giEG/2ws7/ON0wtcYHvFObClI=</cenc:pssh>
                <dashif:Laurl                                    licenseType="license-1.0"
xmlns:dashif="http://dashif.org/guidelines/ContentProtection">https://drm-
license.a3sa.yottacloud.tv/v1/wv/license?content_id=sbg_lab_contentid_A</dashif:Laurl>
            </ContentProtection>
            <Role schemeIdUri='urn:mpeg:dash:role:2011' value='main' />
   <BaseURL>http://10.27.1.146/MMT_DRM/MMTP_VIDEO_try.mp4</BaseURL>
            <Representation id='Video1.1.1.1'/>
          </AdaptationSet>
       </Period>
    </MPD>
```

It may now be appreciated that present principles provide a way to use new standards for ATSC 3.0 transmission of media over-the-air using existing DASH software players, which is technically less burdensome that writing a new software player from scratch for straight MMTP playback based on the new standards, since existing software players already know what to do using a DASH MPD file constructed as set forth above. Thus, MMT DRM playback is enabled using DASH media players according to new ATSC protocols for DRM.

It will be appreciated that whilst present principals have been described with reference to some example embodiments, these are not intended to be limiting, and that various alternative arrangements may be used to implement the subject matter claimed herein.

What is claimed is:

1. A media playback apparatus, comprising:

at least one computer memory that is not a transitory signal and that comprises instructions executable by a processor system to:

receive Moving Picture Experts Group (MPEG) media transport protocol (MMTP) content from a source of content;

use the MMTP content to construct a Dynamic Adaptive Streaming over Hypertext Transfer Protocol (DASH) Media Presentation Description (MPD) file, the DASH file indicating DASH content; and access the DASH MPD file to play the DASH content using a DASH player;

wherein constructing the DASH file comprises:

writing, for the DASH file and using the MMTP content, all three of: media processing units (MPU) header data, fragment header data, and MPU data;

accounting for discarded Fragment Type 3 data in relation to a media data (MDAT) section of the DASH media files; and appending digital rights management (DRM) data to the DASH MPD file being constructed.

2. The media playback apparatus of claim 1, wherein the instructions are executable to:

account for the discarded Fragment Type 3 data by reducing an amount of bytes indicated in the MDAT section of the DASH media files compared to an amount of bytes indicated in an MDAT section of the MMTP content.

3. The media playback apparatus of claim 1, wherein the instructions are executable to:

account for the discarded Fragment Type 3 data by adding zeros at the end of Fragment Type 2 data of the DASH media files.

4. The media playback apparatus of claim 1, wherein the instructions are executable to:

write first, for the DASH media file and using the MMTP content, the MPU header data;

write second, for the DASH media file and using the MMTP content, the fragment header data; and write third, for the DASH media file and using the MMTP content, the MPU data.

5. The media playback apparatus of claim 4, wherein the MPU data comprises one or more of: audio data, video data.

6. The media playback apparatus of claim 1, comprising the processor system.

7. The media playback apparatus of claim 1, wherein the source of content comprises an Advanced Television System Committee (ATSC) 3.0 system source.

8. The media playback apparatus of claim 1, wherein the instructions are executable to:

receive the MMTP content from a MMTP delivery channel; and extract the MMTP content from user datagram protocol (UDP) data from the delivery channel to construct the DASH files.

9. The media playback apparatus of claim 1, wherein the instructions are executable to:

play the DASH content using the DASH player.

10. A method, comprising:

receiving Moving Picture Experts Group (MPEG) media transport protocol (MMTP) content from a source of content;

using the MMTP content to construct a Dynamic Adaptive Streaming over Hypertext Transfer Protocol (DASH) Media Presentation Description (MPD) file, the DASH file indicating DASH content; and accessing the DASH MPD file to play the DASH content using a DASH player;

wherein constructing the DASH file comprises:

writing, for the DASH media files and using the MMTP content, all three of:

media processing units (MPU) header data, fragment header data, and MPU data;

accounting for discarded Fragment Type 3 data in relation to a media data (MDAT) section of the DASH media files; and appending digital rights management (DRM) data to the DASH MPD file being constructed.

11. The method of claim 10, comprising:

accounting for the discarded Fragment Type 3 data by reducing an amount of bytes indicated in the MDAT section of the DASH media files compared to an amount of bytes indicated in an MDAT section of the MMTP content.

12. The method of claim 10, comprising:
accounting for the discarded Fragment Type 3 data by adding zeros at the end of Fragment Type 2 data of the DASH media files being constructed.

13. The method of claim 1, comprising:
writing first, for the DASH media file and using the MMTP content, the MPU header data;
writing second, for the DASH media file and using the MMTP content, the fragment header data; and
writing third, for the DASH media file and using the MMTP content, the MPU data.

14. The method of claim 13, wherein the MPU data comprises one or more of:
audio data, video data.

15. The method of claim 10, wherein the source of content comprises an Advanced Television System Committee (ATSC) 3.0 system source.

16. The method of claim 10, comprising:
receiving the MMTP content from a MMTP delivery channel; and
extracting the MMTP content from user datagram protocol (UDP) data from the delivery channel to construct the DASH files.

17. An apparatus, comprising:
a processor system; and
at least one computer storage comprising instructions executable by the processor system to:
receive Moving Picture Experts Group (MPEG) media transport protocol (MMTP) content from a source of content;
use the MMTP content to construct a Dynamic Adaptive Streaming over Hypertext Transfer Protocol (DASH) Media Presentation Description (MPD) file, the DASH file indicating DASH content; and
access the DASH MPD file to play the DASH content using a DASH player;
wherein constructing the DASH file comprises:
writing, for the DASH file and using the MMTP content, all three of: media processing units (MPU) header data, fragment header data, and MPU data;
accounting for discarded Fragment Type 3 data in relation to a media data (MDAT) section of the DASH media files; and
appending digital rights management (DRM) data to the DASH MPD file being constructed.

18. The apparatus of claim 17, wherein the instructions are executable to:
account for the discarded Fragment Type 3 data by reducing an amount of bytes indicated in the MDAT section of the DASH media files compared to an amount of bytes indicated in an MDAT section of the MMTP content.

19. The apparatus of claim 17, wherein the instructions are executable to:
account for the discarded Fragment Type 3 data by adding zeros at the end of Fragment Type 2 data of the DASH media files being constructed.

20. The apparatus of claim 17, wherein the instructions are executable to:
write first, for the DASH media files and using the MMTP content, the MPU header data;
write second, for the DASH media files and using the MMTP content, the fragment header data; and
write third, for the DASH media files and using the MMTP content, the MPU data.

* * * * *